(12) United States Patent
Sinha et al.

(10) Patent No.: US 10,902,443 B2
(45) Date of Patent: Jan. 26, 2021

(54) DETECTING DIFFERING CATEGORICAL FEATURES WHEN COMPARING SEGMENTS

(71) Applicant: ADOBE INC., San Jose, CA (US)

(72) Inventors: Ritwik Sinha, Bangalore (IN); Shiv Kumar Saini, Bangalore (IN); Trevor Paulsen, Lehi, UT (US); Mike Rimer, Saratoga Springs, UT (US)

(73) Assignee: ADOBE INC., San Jose, CA (US)

( * ) Notice: Subject to any disclaimer, the term of this patent is extended or adjusted under 35 U.S.C. 154(b) by 813 days.

(21) Appl. No.: 15/296,999

(22) Filed: Oct. 18, 2016

(65) Prior Publication Data

US 2018/0108029 A1  Apr. 19, 2018

(51) Int. Cl.
*G06Q 30/02* (2012.01)
*G06F 7/58* (2006.01)

(52) U.S. Cl.
CPC .......... *G06Q 30/0204* (2013.01); *G06F 7/58* (2013.01)

(58) Field of Classification Search
USPC ................................. 705/7.11–7.42
See application file for complete search history.

(56) References Cited

U.S. PATENT DOCUMENTS

2004/0073520 A1* 4/2004 Eskandari .............. G06Q 30/02
                                                              705/400
2007/0143184 A1* 6/2007 Szmanda ........... G06Q 30/0269
                                                              705/14.52
2016/0260113 A1* 9/2016 Simpson ............ G06Q 30/0204

OTHER PUBLICATIONS

Badcon, James Robert, "The Voice of America Program Advertising Campaing as Measured by Commercial Standards", Department of Economics, The University of Southern California, pp. 1-125, Aug. 1951. (Year: 1951).*

(Continued)

*Primary Examiner* — Amber A Misiaszek
(74) *Attorney, Agent, or Firm* — F. Chau & Associates, LLC

(57) ABSTRACT

Techniques are disclosed for identifying, assessing, and presenting differences between segments of customers. The techniques identify differences in categorical features of the customers in two segments. The techniques use observed data to identify differences in a categorical feature. The techniques then assess whether the observed difference is a real difference applicable to the entire customer population or the result of random chance. The categorical features with the most significant differences (i.e., unlikely due to random chance) are presented, for example, to allow a marketer to easily appreciate the most significant segment differences. Certain techniques account for segment overlap (i.e., customers being in both segments) in assessing whether differences are due to random chance. Certain techniques limit the presented categorical features to account for common knowledge and/or false testing issues. Certain techniques present segment differences incrementally during the computations to provide quicker access to relevant information.

19 Claims, 7 Drawing Sheets

(56) References Cited

OTHER PUBLICATIONS

Google Analytics Visitor Segmentation: Users, Sequences, Cohorts! Retrieved from URL http://www.kaushik.net/avinash/google-analytics-visitor-segmentation-users-sequences-cohorts/ on Dec. 27, 2016 (48 pages).

Contribution Analysis. Retrieved from URL https://marketing.adobe.com/resources/help/en_US/analytics/contribution/ on Dec. 27, 2016 (8 pages).

Anomaly Detection and Contribution Analysis. Retrieved from URL https://marketing.adobe.com/resources/help/en_US/analytics/analysis-workspace/anomaly_detection.html on Dec. 27, 2016 (5 pages).

\* cited by examiner

201

| Categorical Features | Analytics Addicts Customers % of Total | Discover Users Customers % of Total | Difference |
|---|---|---|---|
| Company: Adobe | 87% | 2% | 85% |
| Page: Home | 1% | 75% | -74% |
| Action Name: Drag | 5% | 60% | -55% |
| City: London | 6% | 54% | -48% |
| Browser Type: Chrome | 50% | 25% | 25% |

202

| Categorical Features | Analytics Addicts Customers % of Total | Discover Users Customers % of Total | Difference |
|---|---|---|---|
| Admin Users | 60% | 2% | 58% |
| Non Admin Users | 1% | 52% | -51% |
| Diamond Customers | 5% | 48% | -43% |
| Platinum Customers | 10% | 43% | -33% |
| Gold Customers | 50% | 28% | 22% |

FIGURE 2

| | | Dimension Element (city=="San Francisco") | | Total |
| --- | --- | --- | --- | --- |
| | | 0 | 1 | |
| Segment | A (State=="NY") | $N_{A0}$ | $N_{A1}$ | $N_A$ |
| | B (Device=="iPhone") | $N_{B0}$ | $N_{B1}$ | $N_B$ |

| | Null True | Alternative True | Total |
| --- | --- | --- | --- |
| Not Called Significant | U | T | m-R |
| Called Significant | V | S | R |
| | $m_0$ | $m - m_0$ | m |

DETECTING DIFFERING CATEGORICAL FEATURES WHEN COMPARING SEGMENTS

TECHNICAL FIELD

This disclosure relates generally to computer-implemented methods and systems and more particularly relates to improving the efficiency and effectiveness of computing systems used to distribute electronic content and compare segments of customers accessing electronic content via computer networks such as the Internet.

BACKGROUND

Information is collected about customers for various purposes. For example, marketers collect such information to better cater to the needs, preferences, and interests of their customers or to more effectively provide relevant marketing content to targeted populations of customers having interest in particular goods or services. Customers, as the term is used herein, are people who use or who may someday use an electronic device to execute a web browser, use a search engine, use a social media application, or otherwise access electronic content via an electronic network. Marketing content is often presented to customers when the customers use web browsers, search engines, social media applications, and other computer tools to access electronic content. In one example, a customer is presented with a promotion for a retail item when the customer accesses a particular webpage or initiates a search engine search using a particular keyword. Such promotions are often tailored to the customer, for example, having been selected based on the webpage, the keyword, and/or the customer's identity or other customer information, e.g., based on the customer's city.

Segmenting customers into specific segments is useful in providing tailored promotions and for other marketing purposes. A "segment," as the term is used herein, is a set of customers or customer data that satisfy a specified rule. For example, one marketer defines a segment of customers who have more than two orders, defines another segment of customers who have visited a sports sections of the marketer's web site, and defines another segment of customers from a particular city. Customers that satisfy the criteria of these rules are included in the respective segments. The marketer can then analyze segment-specific customer interaction data (e.g., clicks, requests, purchases, etc.) to tailor marketing efforts to the particular segments of customers.

Electronic systems used by marketers to define segments, track segments, and market to segments do not help marketers understand their defined segments. Marketers often define many, many different segments because, among other things, of the marketers having numerous and varying business objectives. It is often difficult for a marketer to distinguish between his defined segments and understand how the segments differ from one another. Manual comparison of segments using existing marketing systems is generally not feasible and would lack accuracy. Comparing the large number of characteristics about customers to identify characteristics in which the segments differ significantly would have been time consuming and generally impractical. Moreover, manual comparison of segment differences based on observed data would have been subjective and thus would have lacked accuracy. More specifically, marketers making manual observations would have no way of knowing if differences in the observed data reflect actual differences in the entire population of customers or are due to random chance. Existing systems that assist marketers with segmenting customers have thus not provided any way for marketers to identify significant segment differences or distinguish real segment differences applicable to all customers from segment differences observed due to random chance.

SUMMARY

Techniques are disclosed herein for identifying, assessing, and presenting differences between segments of customers. The techniques identify differences in categorical features of the customers in two segments being compared with one another. Categorical features include features that do not have a numerical ordering, such as city, state, browser type, etc. The techniques use observed data to identify differences in a categorical feature (e.g., 20% of customers in the first segment use browser brand X while 50% of the customers in the second segment use browser brand X in the observed data). The techniques then assess whether an observed difference (e.g., the 30% difference) is a real difference applicable to all customers in the entire population of customers or the result of random chance. The categorical features with the most significant differences (i.e., the ones most unlikely to be due to random chance) are presented in a user interface. This allows a marketer to quickly and easily appreciate the most significant segment differences.

Certain techniques account for segment overlap (i.e., customers being in both of the segments in the comparison) in assessing whether segment differences are due to random chance. These techniques identify a first segment and a second segment to compare. The techniques determine a first percentage of first segment customers having a categorical feature in observed data and similarly determine a second percentage of second segment customers having the categorical feature in the observed data. An observed difference between the first percentage and the second percentage is determined. The techniques assess whether this observed difference is due to random chance or is applicable to all customers using a statistical hypothesis test that accounts for segment overlap. Specifically, the techniques compute a test statistic that compares a first probability of observing the categorical feature in all customers in the first segment against a second probability of observing the categorical feature in all customers in the second segment. Formulating the computation in this way allows the techniques to address the uncertainty in the observed data. Moreover, the test statistic computation uses a factor that accounts for a subset of customers being in both the first segment and the second segment. This prevents customers being within both segments from interfering with the accuracy of the computation. The test statistic is used to determine the probability that the observed difference is due to random chance. The less likely the probability that the observed difference is due to random chance, the more likely the observed difference is a real difference applicable to all customers.

Techniques of the invention provide additional and/or alternative features. For example, certain techniques identify and avoid presenting categorical features with segment differences that are based on common knowledge. Certain techniques limit the presented categorical features with segment differences to account for false testing issues that result from using the testing techniques multiple times to assess a large number of categorical features. Certain techniques use novel presentation techniques to present segment differences on an interface to improve the experience of the marketer. For example, the segment differences can be presented incrementally while the computations to identify and assess the significant differences are being performed.

These illustrative features are mentioned not to limit or define the disclosure, but to provide examples to aid understanding thereof. Additional techniques are discussed in the Detailed Description, and further description is provided there.

BRIEF DESCRIPTION OF THE FIGURES

These and other features, Techniques, and advantages of the present disclosure are better understood when the following Detailed Description is read with reference to the accompanying drawings.

FIG. 2 is block diagram depicting charts that could be displayed on a user interface to display segment differences.

DETAILED DESCRIPTION

Figure 1:
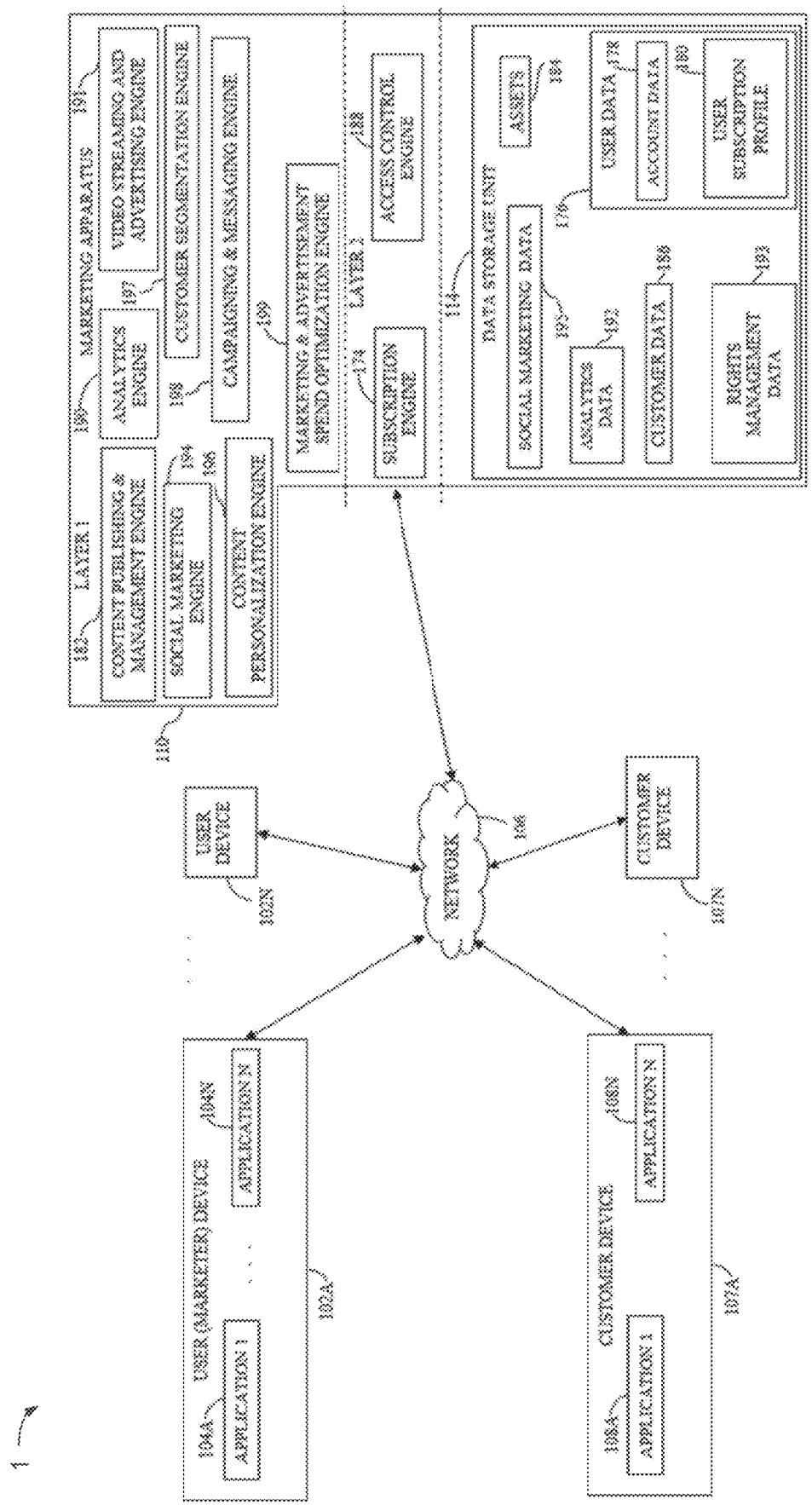
FIG. 1 illustrates an exemplary computer network environment in which techniques for identifying, assessing, and presenting differences between segments of customers can be implemented.

As described above, existing systems that assist marketers with segmenting customers have not provided adequate ways for marketers to identify significant differences between segments. The large number of different characteristics about customers and the large number of segments that are typically available in Internet-based systems makes it infeasible to manually evaluate and compare segments to identify the segment characteristics that differ the most between two segments. Moreover, the available information about segment characteristics is typically based on observations about only some of the customers in a segment. For example, observations of 10,000 customers in a first segment may reveal that 3,000 of the customers are gold members, 1,000 are not gold members, and for the other 6,000 customers it is unknown whether the customers are gold members or not. Observations of 10,000 customers in a second segment may show that 2,000 of the customers are gold members, 2,000 are not gold members, and for the other 6,000 customers it is unknown whether the customers are gold members or not. In this example, existing systems do not compile customer information to enable a marketer to identify percentages of customers in the segments that are gold members, e.g. 75% of observed customers in the first segment (3000 gold member customer/4000 first segment customers for which observed data is available) and 50% of observed customers in the second segment (2000 gold member customer/4000 second segment customers for which observed data is available).

Moreover, even if such information were available to the marketer, the marketer would be unable to manually comprehend the statistical significance of observations to the entire segment populations. Specifically, the marketer would not know whether the 25% difference (75%-50%) was due to random chance in the observed data or due to an actual difference likely to be present in the entire populations of the segments. Evaluating the significance of such a difference is unintuitive and requires statistical computations beyond the realm of human mental abilities. As a result, any manual evaluation of such information would be subjective, inconsistent, and impractical.

The disclosed invention addresses these and other deficiencies of existing systems by providing computer-implemented techniques that collect and organize large volumes of observed customer data and use objective, statistically-based evaluations of the observed customer data to assess the significance of segment differences. The techniques additionally display the most significant segment differences in a user interface for easy comprehension and use by marketers. The techniques can be used in the context of very large volumes of customer data collected using the Internet and other computer technologies and thus address problems that are unique to large network computing environments. Moreover, the techniques provide objective, statistically-based evaluations of observed data that are different from the subjective, intuitive analysis that a marketer would otherwise be required to attempt to evaluate segment differences manually.

The techniques first identify potential differences between segments by identifying differences in observed data. Specifically, the techniques identify differences between segments by comparing the probabilities in the observed data that customers in each of the compared segments will have particular categorical features. In an example, consider a first segment of customers from California and a second segment of customers from New York. In observed customer data, 20% of customers in the first segment (from New York) use a Brand X web browser, while 50% of customers in the second segment (from California) use the Brand X browser. Thus, there is a 30% difference (i.e., 50%-20%) between the segments with respect to this categorical feature. Techniques of the invention analyze segment differences in many categorical features. The techniques identify the most significant differences and present those categorical features to the marketer. In one example, a user interface displays an ordered list of the top N (e.g., 10) most different categorical features. The user interface summarizes the most significant differences in one succinct report that allows the marketer to better understand the segments. In the Internet context in which there can be hundreds or thousands of categorical features, techniques of the invention select and present the most significant categorical feature differences between two segments to facilitate an understanding of the segments that is not possible by manually observation.

In addition, techniques of the invention account for uncertainty in assessing segment differences using objective, statistically-based techniques. In many circumstances, customer data is based on observations (e.g., user interactions, profiles, and data compiled from other sources) that do not provide complete information for all customers. Thus, there is uncertainty as to whether an observed difference is a real difference applicable to all customers or is due to random chance in the relatively small volume of observed data in which the difference is identified. The techniques of the invention use computer-implemented evaluations to determine whether observed differences based on observed data correspond to real differences applicable to all customers or are instead due to random chance because of the limited amounts of observed data. For example, consider determining the 30% difference of the above example based on having only a few relevant data items in the observed data. As a specific example, the 30% difference could be determined based on 2 out of 10 (20%) first segment customers in the observed data using the Brand X browser and 5 out of 10 (50%) second segment customers in the observed data using the Brand X browser. If the population of customers is large (e.g., 10,000+ users), there is a relatively higher probability that this 30% difference derived from such little observed data will be due to random chance. The greater the amount of observed data relative to the total population, the less uncertainty. Techniques of the invention compute a test statistic that assesses this uncertainty by objectively, quantifying the probability is due to random chance rather than being a real difference applicable to all customers. In the above example, in which there are only 10 data observations and 10,000+ customers, the techniques would compute this test statistic to determine a relatively high probability that the observed difference is due to random chance in the observed data rather than being a real difference applicable to all customers.

In contrast, consider determining the 30% difference of the above example based on more relevant data. As a specific example, the 30% difference could be determined based on 200 out of 1000 (20%) first segment customers in the observed data using the brand X browser and 1000 out of 2000 (50%) second segment customers in the observed data using the brand X browser. In this case, the techniques of the invention would compute a test statistic to determine a relatively lower probability that the observed difference is due to random chance in the observed data rather than being a real difference applicable to all customers. The technique not only identify that there is less uncertainty when there is relatively more observed data, but provide objective quantifications of how likely a difference is to be due to random chance versus being a real difference in all customers and thus provide a basis for objectively comparing segment differences with one another.

Unlike manual techniques used to generalize from observed data that would be subjective and based on intuition, techniques of the invention use objective, computer-implemented statistical techniques capable of assessing whether observed differences in large volumes of data correspond to real differences or to random chance. Certain techniques of the invention use a statistical hypothesis test in which the test statistic is a difference between the segments having a characteristic based on observed data (e.g., the 30% above example) and determine a probability (i.e., p-value) that the observed difference is due to random chance. This hypothesis test technique is also referred to as a risk difference technique. In comparing two segments, techniques of the invention identify multiple categorical feature differences (e.g., a 30% difference of customers using brand X browser use, a 5% difference of customers using brand Y browser, a 40% difference of customers with priority status, etc.). The techniques formulate a hypothesis test for each difference and compute the test statistic of the hypothesis test to identify a probability that each difference is due to random chance.

Computer-implemented processes are used to collect and synthesize potentially large volumes of observed data to determine these statistical probabilities that segment differences are due to random chance. The techniques of the invention use these computer-implemented processes in the Internet context in which there can be hundreds or thousands of categorical features and many thousands or millions of data points to determine these probabilities for many segment differences. The techniques use formulations that improve the efficiency and objectivity of determining these probabilities. For example, one technique of the invention provides a way to begin providing results on a user interface even before computations of all segments are computed. The techniques additionally address technical issues resulting from the large volume of data that can be involved and potential complications based on characteristics of the data, such as the potential that segment overlap will skew the determinations of the probabilities.

The techniques of the invention use these probabilities that segment differences are due to random chance to determine which of the differences to identify in the interface. The less likely a difference is due to random chance, the more likely the difference is to be real and the greater the significance of the difference. Thus, categorical features with differences with lower probabilities of being due to random chance are selected for display.

Techniques of the invention additionally or alternatively account for potential overlap of the two segments being compared. Overlap occurs when there are customers in both of the segments being compared. For example, a segment comparison can compare loyal customers (first segment) with mobile customers (second segment). It is possible that there will be overlap between these segments since it is possible that some loyal customers will also be mobile customers. To address such overlap, techniques of the invention use objective, computer-implemented techniques capable of assessing whether observed differences in large volumes of data correspond to real differences or to random chance while also accounting for potential overlap. Computer-implemented processes are used to collect and synthesize potentially large volumes of observed data to determine the statistical probability (i.e., p-value) that a difference between the percentages of customers having a categorical feature in each of the segments is due to random chance. These computer implementations use a factor in performing the hypothesis test that accounts for some of the customers being in both the first segment and the second segment. The factor represents the covariance, which is a measure of how much dependence there is between the probabilities (i.e., one going up effecting the other going up, etc.). The resulting probability that the difference is due to random chance thus provides a more accurate indication of the significance of the difference since it accounts for potential uncertainty due to segment overlap. The probability (i.e., p-value) is valid regardless of whether the segments overlap.

Certain techniques of the invention additionally or alternatively limit the categorical features that are selected and displayed on the user interface to avoid displaying differences that are common knowledge. In the example of a first segment of customers from California and the second segment of customers from New York, there may be a significant difference with respect to a categorical feature that identifies customers from New York City. Since the first segment will have no customer users with the categorical feature of being from New York City and the second segment will have a substantial percentage (e.g., 43%), the difference may initially be identified as a significant difference. However, the difference is based on common knowledge, i.e., that New York City is not in California. Techniques of the invention identify and exclude such differences by identifying differences based on facts that are never true.

Specifically, if the percentage of customers in one of the segments is zero, the techniques exclude the difference as common knowledge.

Certain techniques of the invention use objective, computer-implemented techniques to account for error resulting from conducting multiple tests. Specifically, comparing segments across many categorical features involves many tests and the large number of tests increases the overall chance of error. This is especially true in the Internet context in which there can be hundreds or thousands of categorical feature differences that are being assessed. As the number of tests increases, the chance of a falsely discovered differences increases. Techniques of the invention control this false discovery error by using a computing device to selectively eliminate some of the determinations by estimating those determinations in which there is a greater chance of errors. The techniques of the invention provide efficient and accurate ways of making such determinations by reusing the probabilities (i.e., p-values) already determined in the segment difference comparisons. The computer-implemented techniques eliminate a number of the differences identified by the hypothesis test as significant from consideration based on their p-values. For example, if there are 1000 hypothesis tests that identify significant differences and the false discovery rate is 10%, the hypothesis test results for the 100 worst p-values can be eliminated.

Other techniques of the invention additionally or alternatively provide quicker results on the user interface by progressively providing the categorical features for which there are significant differences as those differences are identified during processing. For example, one technique displays an ordered list of the top N categorical features that is updated during the processing that identifies the significant differences. An initial ordered list is displayed early in the processing. As additional significant differences are identified, the newly identified differences are used to update the ordered list. The user interface is thus able to start displaying relevant information on-the-fly instead of waiting for all of the data analysis to be complete. A status bar can be used to indicate progress. With this approach, the marketer gains insight immediately rather than having to wait for all of the data to be processed.

Terminology

As used herein, the phrase "electronic content" refers to any content in an electronic communication such as a web page or e-mail accessed by, or made available to, one or more individuals through a computer network such as the Internet. Examples of electronic content include, but are not limited to, images, text, graphics, sound, and/or video incorporated into a web page, search engine result, or social media content on a social media app or web page.

As used herein, the phrase "customer" refers to any person who uses or who may someday use an electronic device such as a computer, tablet, or cell phone to execute a web browser, use a search engine, use a social media application, or otherwise use the electronic device to access electronic content via an electronic network such as the Internet. Accordingly, the phrase "customer" includes any person that data is collected about via electronic devices, in-store interactions, and any other electronic and real world sources. Some, but not necessarily all, customers access and interact with electronic content received through electronic networks such as the Internet. Some, but not necessarily all, customers access and interact with online ads received through electronic networks such as the Internet. Marketers send some customers online ads to advertise products and services using electronic networks such as the Internet.

As used herein, the phrase "segment" refers to a set of customers or customer data defined by one or more rules. A segment's "rule" is any criteria that can be used to identify which customers are included in the segment. For example, a first rule for a first segment can identify all customers who have made at least two online purchases and a second rule for a second segment can identify all customers who are platinum reward club members.

As used herein, the phrase "segment overlap" refers to customers being in both of two segments that are being compared. Within a given population of customers, segments can entirely or partially overlap with one another. In the above example, some customers who have made at least two online purchases are also platinum reward club members, and thus those segments overlap with one another.

As used herein the phrase "marketer" refers to a person or entity that analyzes customer data, creates and sends online ads, and/or otherwise creates or implements a marketing campaign to market to customers.

As used herein, the phrase "metric" refers to numeric information about one or more customers or segment including, but not limited to, age, income, number of televisions click-through rate, view-through rate, number of videos watched, conversion rate, revenue, revenue per thousand impressions ("RPM"), where revenue refers to any metric of interest that is trackable, e.g., measured in dollars, clicks, number of accounts opened and so on. Generally, metrics provide a numerical order, e.g., one revenue value is greater than another revenue value which is greater than a third revenue value and so on.

As used herein, the phrase "categorical feature" refers to an item of information about a customer that is not numerically ordered. Dimension elements are one example of a categorical feature. For example, for a "residence city" dimension, the elements of the residence city dimension can take on numerous values, e.g., "New York," "San Jose," etc. Each of these dimension elements, i.e., each residence city, is a categorical feature. Customers in a segment either have or do not have each categorical feature. For example, if the categorical feature is that residence city is "New York", the residence city of a given user is either New York or it is not New York. If the residence city of the customer is New York, the customer has that categorical feature. If not, the customer does not have that categorical feature. Within a segment of customers, a percentage of customers having a categorical feature in observed data can be determined. For example, if 40% of customers in a segment are from New York, the percentage of customers in the segment having the categorical feature is 40% in the observed data.

As used herein, the phrase "dimension" refers to non-numerically-ordered information about one or more customers or segments, including, but not limited to page name, page uniform resource locator (URL), site section, product name, and so on. Dimensions are generally not ordered and can have any number of unique dimension elements. For example, the dimension "country" can take values "USA", "India", "China", "Mexico", and so on. Dimensions will often have matching values for different customers. For example, a state dimensions will have the dimension element "California" for many customers. In some instances, dimensions have multiple values for each customer. For example, a URL dimension identifies multiple URLs for each customer in a segment.

As used herein, the phrase "online ad" refers to an item that promotes an idea, product, or service that is provided electronically in or with a web page, social media, keyword search result, e-mail, or other electronic communication sent, accessed by, or made available to one or more customers through a computer network such as the Internet. Examples of online ads include, but are not limited to, images, text, graphics, sound, and/or video incorporated into a web page, search engine result, or social media content on a social media app or web page that advertise or otherwise promote or sell something, usually a business's product or service.

As used herein, the phrase "hypothesis test" refers to a statistical test that is used to determine whether there is enough evidence in a sample of data to infer that a certain condition is true for the entire population. A hypothesis test examines two opposing hypotheses about a population: the null hypothesis and the alternative hypothesis. For example, a null hypothesis can be that there is no difference between the probability of first segment customers having a categorical feature and the probability of a second segment customers having the categorical feature. The alternative hypothesis can be that there is a difference between the probabilities.

As used herein, the phrase "p-value" refers to a value representing a probability that an observed difference from a statistical hypothesis expectation is due to random chance. For example, in the above exemplary null and alternative hypothesis, a test statistic can be formulated and p-value determined to represent a probability that an observed difference between the probabilities is due to random chance.

FIG. 1 illustrates an exemplary computer network environment 100 in which techniques for identifying, assessing, and presenting differences between segments of customers can be implemented. The environment 100 includes one or more user devices, such as user (marketer) device 102A up to a user device 102N having applications 104A-N. The environment 100 also includes one or more customer devices, such as customer device 107A up to a user device 107N having applications 108A-N. Each of the user devices 102A-N and customer devices 107A-N is connected to a marketing apparatus 110 via a network 106. A user (marketer) uses various products, applications, or services supported by the marketing apparatus 110 via the network 106. A customer receives content from the marketing apparatus 110 and performs interactions that are tracked by the marketing apparatus 110.

The marketing devices 108A-N correspond to various people. Examples of the users include, but are not limited to, marketing professionals who use marketing tools to generate, edit, track, or manage online content, or to manage online marketing process, customers, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the marketing apparatus 110.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Examples of the network 106 include, but are not limited to, internet, local area network (LAN), wireless area network, wired area network, wide area network, and the like.

The marketing apparatus 110 includes one or more engines for providing one or more digital experiences to the user. The marketing apparatus 110 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 110 also includes a data storage unit 114. The data storage unit 114 can be implemented as one or more databases or one or more data servers. The data storage unit 114 includes data that is used by the engines of the marketing apparatus 110.

In one Technique, the marketing apparatus 110 can be divided into two layers of engines, i.e. Layer 1 including core engines that provide workflows and Layer 2 including shared engines that are shared among the core engines. Any core engine can call any of the shared engine for execution of corresponding task. In another Technique, the marketing apparatus 110 does not have layers and each core engine can have an instance of the shared engines. In either Technique, each core engine can access the data storage unit 114 directly or through the shared engines.

The user of the user device 102A visits a webpage or an application store to explore applications supported by the marketing apparatus 110. The marketing apparatus 110 provides the applications as a software as a service (SaaS), or as a standalone application that can be installed on the user device 102A, or as a combination. The user creates an account with the marketing apparatus 110 by providing user details and also by creating login details. Alternatively, the marketing apparatus 110 can automatically create login details for the user in response to receipt of the user details. The user can also contact the entity offering the services of the marketing apparatus 110 and can get the account created through the entity. The user details are received by a subscription engine 174 and stored as user data 176 in the data storage unit 114. In some Techniques, the user data 114 further includes account data 178 under which the user details are stored.

The user can opt for subscription of one or more engines of the marketing apparatus 110. Based on subscription details of the user, a user subscription profile 180 is generated by the subscription engine 174 and stored. The user subscription profile 180 is stored in the data storage unit 114 and indicates entitlement of the user to various products or services. The user subscription profile 180 also indicates type of subscription, i.e. premium subscription or regular subscription.

The marketing apparatus 110 includes a content publishing and management engine 182 that enables the user to create websites and other content. The content publishing and management engine 182 provides an end to end workflow to the user right from creation of content, to hosting of content, to publishing of content, and finally, to management, i.e. editing and republishing, of content. The content publishing and management 182 further includes one or more engines (not shown in FIG. 1), such as asset management engine, website management engine, mobile content management engine, form management engine, search engine and community management engine to enable one or more workflows. The user can create content, such as forms, mobile application or webpage content, using the content publishing and management 182. The user can either do the creation or can send it for creation to third party via workflows provided through the content publishing and management engine 182. The user then publishes the content and manages it through the content publishing and management engine 182. The user can also create communities or forums for discussions with customers (customers) and manage the communities through the content publishing and management engine 182. The content publishing and management engine 182 also provides asset management capabilities including asset searching using various tags and metadata. The content publishing and management engine 182 stores assets 184 in the data storage unit 114. Examples of the assets 182 include, but are not limited to, image, text, document, video, audio, font, and metadata. In addition, the content publishing and management engine 182 enables multisite, i.e. multiple websites and mobile content, management workflows, and commerce, i.e. personalized shopping experiences that incorporate video, social, and other dynamic media, related workflows. For some of the functionalities, such as asset management, the content publishing and management engine 182 can work in conjunction with the creative apparatus 108 and access data from the data storage unit 112.

Each engine of the marketing apparatus 110 also stores customer data 186 for the user in the data storage unit 114. The user or the entity of the user can have one or more customers, including potential customers, and hence, the one or more engines of the marketing apparatus 110 store the customer data 186. The customer data 186 can be shared across these engines or can be specific to each engine. In some Techniques, the access data 184 is a part of the customer data 186. The access to the customer data 186 is controlled by an access control engine 188 which can be shared across the engines of the marketing apparatus 110 or each engine can have one instance of the access control engine 188. The access control engine 188 determines if the user has access to a particular customer data 186 based on the subscription of the user and access rights of the user.

The marketing apparatus 110 also includes an analytics engine 190. The user can enable tracking of the content while creating the content or at any other point. Various methods of tracking can be used. For example, tracking code can be embedded into the content for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user. In addition, in one Technique, the analytics engine 190 also acts as a shared engine and is accessible by other engines to obtain meaningful analysis on basis of which other engines can offer various functionalities to the user. In another Technique, each engine can have an instance of the analytics engine 190 which is customized according to need of that engine. The analytics engine 190 is used for tracking all types of content, such as mobile application, video, image, website, document, advertisement, and also for tracking the assets 184. The analytics engine 190 also supports predictive intelligence to provide predictions based on the analytics data 192. The analytics engine 190 also stitches information tracked from various sources where the content is consumed and provides a holistic view, i.e. 360 degrees' view of the analytics data 192.

The marketing apparatus 110 also includes a social marketing engine 194 for providing social marketing related workflows. The social marketing engine 194 allows the user to share the content on social networks, and then manage the content sharing and associated information, such as posts and comments. For example, the social marketing engine 194 provides recommendations to the user to determine when to post which content and to determine how an audience will react to the post, helps the user to respond to queries from viewers of post, and performs other managing related to the post. In addition to the social networks, the social marketing engine 194 also provides workflows to manage content on blogs, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 110. Alternatively, the engines can have an instance of the social marketing engine 194 and can directly access the social marketing data 195.

The marketing apparatus 110 also includes a content personalization engine 196. The content personalization engine 196 enables the user to provide different digital experiences to the customers when different customers visit the same webpage or same application of the user. The content personalization engine 196 provides various workflows to the user to create different versions of the webpage or the application or the content and to perform AB testing. Based on the testing, the user may choose to provide different personalization for different sets of customers. The content personalization engine 196 also uses the customer data 186 which can be part of the analytics data 192, in one Technique, or can be stored separately in another Technique. The customer data 186 includes customer profiles. The customers, as described herein, also includes mere visitors which are not customers yet. A profile includes one or more attributes of a customer. An attribute, as described herein, is a concept that can be used segment the customers, for example, using a rule. Examples of the attribute include, but are not limited to, geographical location, age, gender, purchase capacity, language, habits, browsing trends, or any other attribute using which the customers can be segmented.

The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

The marketing apparatus 110 also includes a campaigning and messaging engine 198 that enables workflows for the user to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments.

Techniques of the invention for identifying, assessing, and presenting differences between segments of customers can be performed by customer segmentation engine 197 or by any other engine of the marketing apparatus 110. For example, customer segmentation engine 197 can include a segment comparison module that allows a user to identify two segments to be compared and to see comparison results presented on an interface. The interface can order the presented information in a way that facilitates the users understanding of the significant differences between the segments.

A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user. The user can specify attributes for customer segmentation and the campaigning and messaging engine 198 automatically picks the customers to whom the message is to be sent and also personalizes the message based on the attributes of the customer segment. The campaigning and messaging engine 198 also provides AB testing option to the user to test which message to send out of two messages. The campaigning and messaging engine 198 also stores different customer segments for each user in the customer data 186. In addition, the content used for creating personalized messages, email identifiers and other data is stored as part of the customer data 186 which can be specific for the user and inaccessible to other users.

The marketing apparatus 110 also includes marketing and advertisement spend optimization engine 199. The marketing and advertisement spend optimization engine 199 helps the user in budget management for running marketing campaigns, showing advertisements on websites, as search results, social advertisements, and other form of advertising. The marketing and advertisement spend optimization engine 199 tracks budget spend of the user and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing content performed. The customer data 186 further indicates what type of customers visited the marketing content and the analytics data 192 further indicates who all among those customers ended up in performing a transaction.

In various techniques, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user.

The marketing apparatus 110 also includes a video streaming and advertising engine 191 that helps the user, such as broadcasters, cable networks and service providers, create and monetize engaging and personalized viewing experiences. The video streaming and advertising engine 191 can be implemented to provide a software development kit to the user to build and deliver videos to the customers. In addition, the video streaming and advertising engine 191 provides workflows to the user to insert advertisement within the videos and provides recommendations to the user for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user. For example, if a video is paid then the video streaming and advertising engine 191 does not provide access to the customer based on the rights management data 193. Using the rights management data 193, the video streaming and advertising engine 191 protects content rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

FIG. 2 is block diagram 201 depicting user interfaces displaying segment differences in charts 201, 202. Chart 201 compares categorical features for two segments: a first segment of customers who are "Analytic Addicts" and a second segment of customers who are "Discover Users." The chart identifies the comparison information for 5 categorical features. Each categorical features is a particular dimension element of a particular dimension. For example, the "Company:Adobe" categorical feature identifies that a "company" dimension must have a dimension element of "Adobe." In this example, the chart 201 orders the categorical information based on the magnitude (i.e., absolute value) of the differences to present the most significant differences to the marketer.

Chart 202 compares another type of categorical features for the two segments—overlap with additional segments. The chart 202 identifies the comparison information for 5 different categorical features. Each categorical features in this example is another segment—thus each categorical features determines whether a customer is also in that other segment. For example, the chart shows that 60% of the Analytics Addicts segment customers are also in the segment "Admin Users," but only 2% of the customers in the Discover Users" segment are also in the "Admin Users" segment. In this example, the chart 302 orders the categorical information based on the magnitude (i.e., absolute value) of the differences. Providing information about how two segments differ with respect to overlapping additional segments allows a marketer to better understand how the numerous segments he or she has defined relate to one another.

Figure 3:
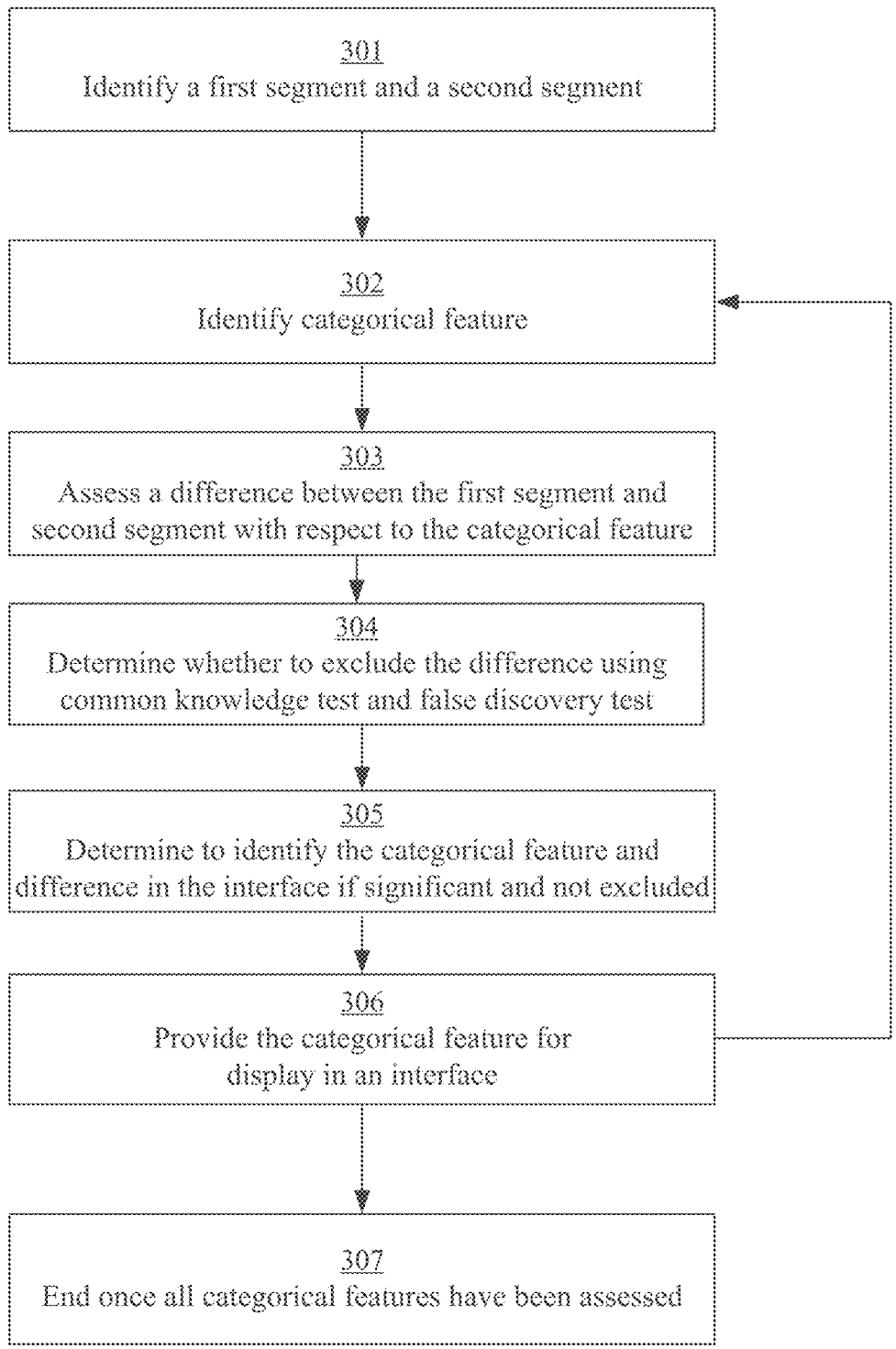
FIG. 3 is a flow chart illustrating an exemplary technique for identifying, assessing, and presenting difference between segments of customers.

FIG. 3 is a flow chart illustrating an exemplary technique 300 for identifying, assessing, and presenting difference between segments of customers. Exemplary technique 300 is performed by one or more processors of one or more computing devices such as by the customer segmentation engine 197 of FIG. 1. Software code for performing the operations of technique 300 can be stored on a non-transitory computer readable medium and executed by one or more processors.

Technique 300 involves identifying a first segment and a second segment, as shown in block 201. The first and second segments can be identified based on user (marketer) input identifying each segment. Alternatively, one or both of the segments can be automatically identified for comparison. In one example, a first segment is identified based on user input and the second segment is automatically identified as the segment of all customers not in the first segment. In another example, segments are related, e.g., member status segments (gold, silver, bronze, etc.) and the second segment is automatically determined based on the relationship, e.g., selection of gold members as the first segment results in a default value of silver members for the second segment. In another example, user (marketer) input identifies each of the two segments independently.

Technique 300 next iteratively identifies, assesses, and displays significant differences of categorical features in a user interface, as shown in blocks 302-306. This process involves, identifying the categorical feature, as shown in block 302. The technique 300 then assess a difference between the first segment and the second segment with respect to the categorical feature, as shown in block 303. For example, the percentage of customers in each of the segments that has the categorical feature can be identified and used to determine a numerical difference. Assessing the difference can also involve accounting for the possibility that the difference can be caused by random chance and/or accounting for segment overlap. Examples of accounting for these conditions are described below with respect to FIGS. 4 and 5 and elsewhere herein.

The technique 300 next determines whether to exclude the difference using a common knowledge test and a false discovery test, as shown in block 304. For example, differences that are due to a condition that is never true (e.g., customers from California are never from New York City) can be excluded as common knowledge. As another example, a certain percentage of the differences that have the most uncertainty can be excluded using a false discovery rate. These exclusions techniques are discussed in greater detail below.

The technique 300 further involves determining to identify the categorical feature and the corresponding difference in the interface if the difference is significant and is not excluded, as shown in block 305, and providing the categorical feature for display in the interface, as shown in block 306. Thus, as the technique 300 progresses and more and more categorical feature differences are assessed, the interface will incrementally be updated with the new information. New categorical feature differences will be added and previously presented differences will be removed. Once all of the categorical features have been assessed, the interface continues to display a list of the top categorical feature differences. The list can be ordered based on the significance of the differences. The process ends in block 307.

Embodiments of the invention provide techniques, systems, and computer-readable mediums with stored instructions that enable determining differences between segments of customers for display in an interface. The functions involved in these embodiments of the invention generally involve determining an observed difference between first segment customers and second segment customers having a categorical feature in observed data, determining a probability that the observed difference is due to random chance, and providing the categorical feature for display in the interface based on the probability that the observed difference is due to random chance. These functions are generally implemented on one or more computing devices that use one or more processors to execute algorithms of one or more operations defined in stored instructions. The operations of various exemplary algorithms that can be employed to perform these functions are discussed in FIGS. 4 and 5 and throughout this specification.

Figure 4:
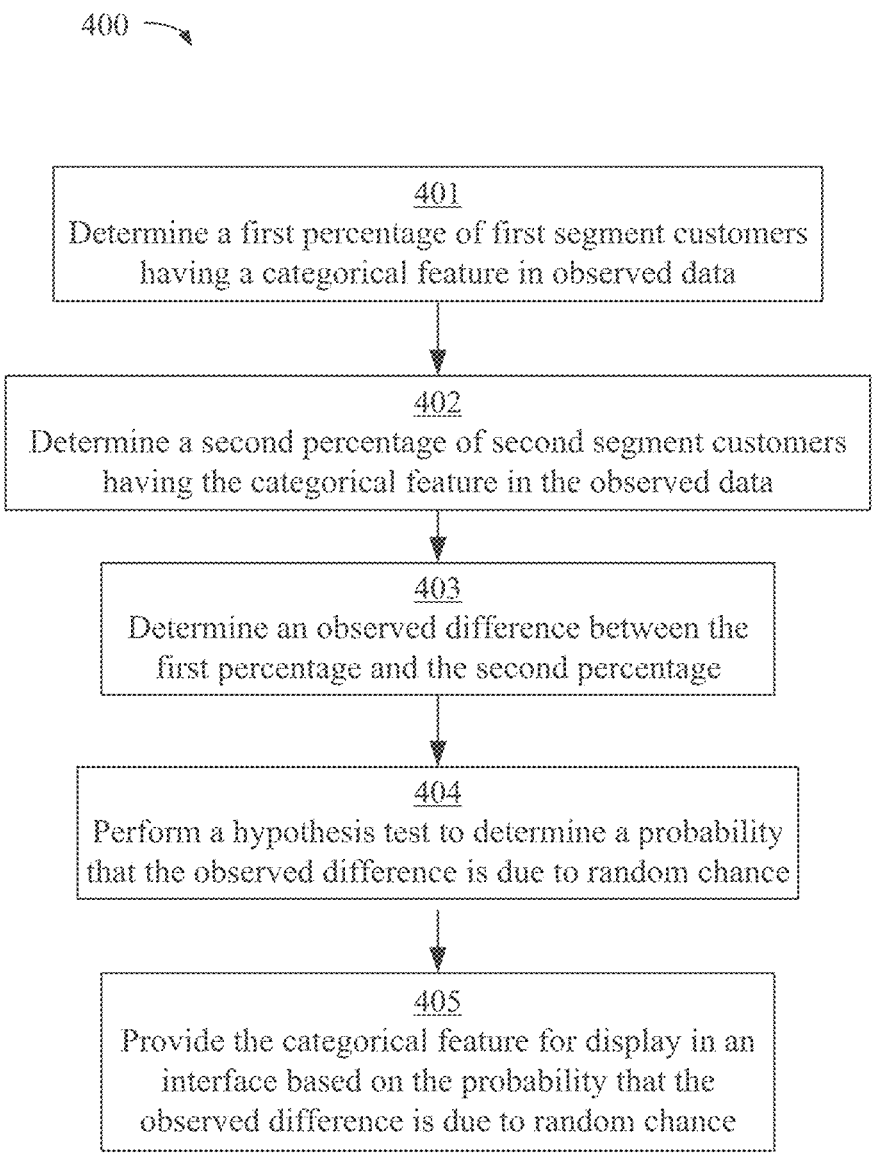
FIG. 4 is a flow chart illustrating an exemplary technique for using a statistical hypothesis test to determine a difference between segments of customers for display in an interface.

FIG. 4 is a flow chart illustrating an exemplary technique 400 for using a statistical hypothesis test to determining a difference between segments of customers for display in an interface. Exemplary technique 400 is performed by one or more processors of one or more computing devices such as by the customer segmentation engine 197 of FIG. 1. Software code for performing the operations of technique 400 can be stored on a non-transitory computer readable medium and executed by one or more processors.

Technique 400 involves determining a first percentage of first segment customers having a categorical feature in observed data, as shown in block 401. Similarly, technique 400 further involves determining a second percentage of second segment customers having the categorical feature in the observed data, as shown in block 402. The determinations examine the observed customer data for customers in each of the segments and determine what percentage of the customers in each segments have the particular categorical feature. For example, if the feature is having a residence city of New York, the determination can involve determining looking at all of the customers in each segment, identifying how many of those have known/observed residence cities, and then determining what percentage of the customers with known/observed residence cities have residence cities of New York.

The technique 400 next involves determining an observed difference between the first percentage and the second percentage, as shown in block 403. For example, if, in the observed data, the first percentage of the first segment customers having residence city of New York is 20% and the second percentage of the second segment customers having residence city of New York is 50%, the difference of 30% is identified.

The technique 400 next performs a hypothesis test to determine a probability that the observed difference is due to random chance, as shown in block 404. This probability is determined by determining an appropriate statistical hypothesis and test statistic and computing a p-value that represents the probability that the observed difference is due to random chance. Specifically, the null hypothesis of is that the segments are the same with respect to the categorical feature, i.e., that the probability of first segment customer having the categorical feature is the same as the probability of the second segment customers. The smaller the p-value that is obtained, the more significant the evidence is that the null hypothesis should be rejected, and hence that the segments are more significantly different with respect to the categorical feature. This does not necessarily mean that rejection of the null hypothesis must be recommended. Certain techniques use the probabilities (i.e., p-values) of multiple categorical features to rank (smaller first) the significance of differences in the categorical features between segments.

The following provides an exemplary formulation of a hypothesis test and test statistic to evaluate a difference in a categorical feature between two segments. Let $D_j$ be the value of dimension D for the jth person. Further, let the number of possible values for D be |D|. Define (for ease of notation, j is dropped from the notation in the definition below), the probabilities of each of segments A and B having the categorical feature i:

$$p_{Ai}=P(D_j=i|Segment=A) \text{ and}$$

$$p_{Bi}=P(D_j=i|Segment=B).$$

The formulation uses a null hypothesis that there is no difference between the above probabilities, i.e., that they are equal to one another.

$$H_0:p_{Ai}=p_{Bi} \text{ vs. } H_1:p_{Ai} \ne p_{Bi}$$

The sample sizes are defined as follows (with $I(\cdot)$ denoting the indicator function):

$$n_A = \sum_{j=1}^{n} I(j \in A),$$

$$n_B = \sum_{j=1}^{n} I(j \in B),$$

$$n_{A \cap B} = \sum_{j=1}^{n} I(j \in A \cap B).$$

Also, the point estimates of $p_{Ai}$ and $p_{Bi}$ are defined as follows.

$$\hat{p}_{Ai} = \sum_{j \in A} \frac{I(D_j = i)}{n_A},$$

$$\hat{p}_{Bi} = \sum_{j \in B} \frac{I(D_j = i)}{n_B}.$$

To enable the comparison, the following test statistic is used:

$$T_i = \hat{p}_{Ai} - \hat{p}_{Bi}.$$

The test statistic is the difference of the proportions for the two segments, i.e., the proportion of segment one customers having the categorical feature versus the proportion of segment two customers having the categorical feature in the observed data. The test statistic provides a value that can be used to determine whether one hypothesis (i.e., that there is a significant difference in the overall population) or another hypothesis (i.e., that there is not a significant difference in the overall population) is true. This test statistic is always unbiased, meaning that the test statistic is calculated in a way that it is not systematically different from the population parameter of interest (i.e., the true difference in proportion), that is, $$E(T_i)=p_{Ai}-p_{Bi}.$$

When the two segments do not overlap:

$$V(\hat{p}_{Ai} - \hat{p}_{Bi}) = \left[ \frac{p_{Ai}(1 - p_{Ai})}{n_A} + \frac{p_{Bi}(1 - p_{Bi})}{n_B} \right].$$

The hypothesis of interest can be tested using the following z test statistic:

$$z_i = \frac{\hat{p}_{Ai} - \hat{p}_{Bi}}{\sigma(\hat{p}_{Ai} - \hat{p}_{Bi})}.$$

The p-value for the test statistic is given by:

$$p\text{-value}=2\times\Phi(-|z_i|),$$

where $\Phi(\cdot)$ is the cumulative distribution function of the standard normal variable. This p-value represents the probability that the observed difference is due to random chance. Note that FIG. 5, described below, describes a modified formulation of the hypothesis test and p-value that can be used in circumstances in which there may be overlap between the segments being compared. Such a formulation could be used for hypothesis testing of block 404.

The technique 400 provides the categorical feature for display in an interface based on the probability that the observed difference is due to random chance, as shown in block 405. For example, the interface can identify the top N categorical features that distinguish the segments from one another. The interface can identify the particular percentages, e.g., identifying that the percentage of the first segment customers having residence city of New York is 20%, that the percentage of the second segment customers having residence city of New York is 50%, and that the difference is 30%.

In comparing two segments, techniques of the invention identify multiple categorical feature differences (e.g., a 30% difference of customers using brand X browser use, a 5% difference of customers using brand Y browser, a 40% difference of customers with priority status, etc.). The techniques formulate a hypothesis test for each difference to identify a probability that each difference is due to random chance. These probabilities are then used to determine which of the differences to identify on the user interface to the marketer. The less likely a difference is due to random chance, the more likely the difference is to be real and the greater the significance of the difference. Thus, categorical features with differences with lower probabilities of being due to random chance are selected for display.

Figure 5:
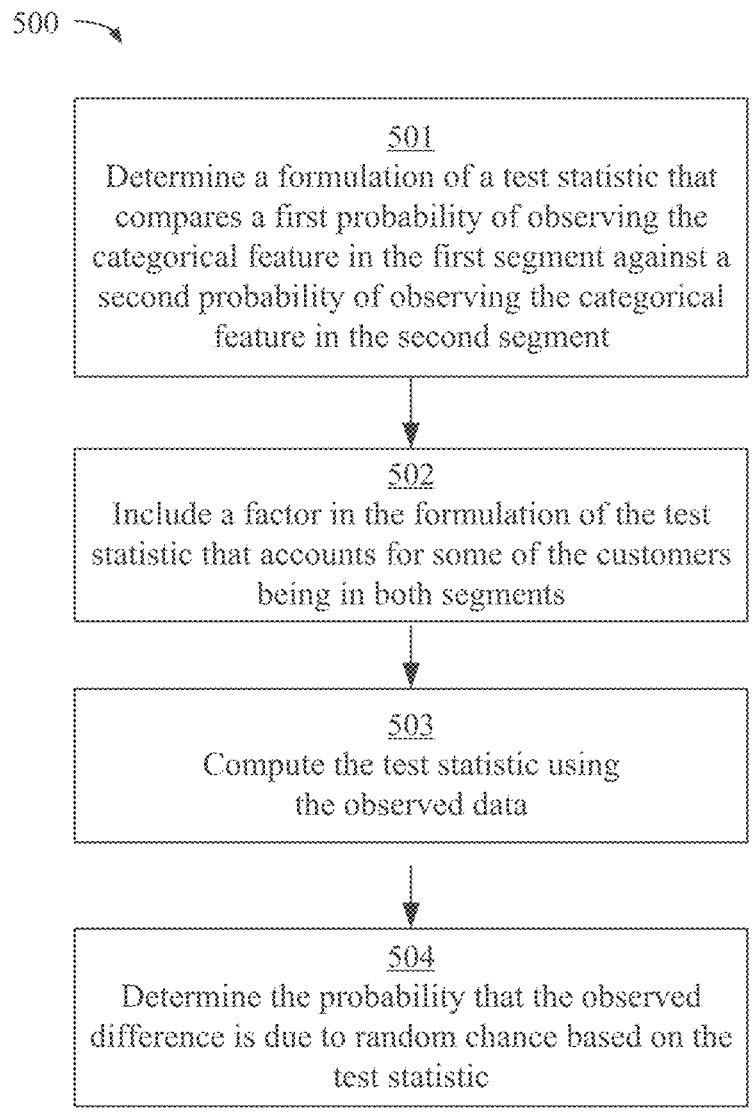
FIG. 5 is a flow chart illustrating an exemplary technique for determining the probability (i.e., p-value) that an observed difference is due to random chance based on a test statistic that accounts for segment overlap.

FIG. 5 is a flow chart illustrating an exemplary technique 500 for determining the probability (i.e., p-value) that an observed difference is due to random chance based on a test statistic that accounts for segment overlap. Exemplary technique 500 is performed by one or more processors of one or more computing devices such as by the customer segmentation engine 197 of FIG. 1. Software code for performing the operations of technique 500 can be stored on a non-transitory computer readable medium and executed by one or more processors. The technique 500 is an example technique for performing a hypothesis test to determine a probability that an observed difference is due to random chance described above with respect to block 404 of FIG. 4. The technique 500, however, uses a modified hypothesis test that accounts for segment overlap.

The technique 500 involves determine a formulation of a test statistic that compares a first probability of observing the categorical feature in the first segment against a second probability of observing the categorical feature in the second segment, as shown in block 501. Such a formulation can be determined via the technique described with respect to block 404 of FIG. 1.

The technique 500 involves including a factor in the formulation of the test statistic that accounts for some of the customers being in both segments, as shown in block 502. For example, the formulation of block 404 of FIG. 4 can be modified using the Delta method to arrive at a valid test statistic even when segments overlap. For example, building on the above example that modeled the test statistic as:

$$T_i = \hat{p}_{Ai} - \hat{p}_{Bi}.$$

$\hat{p}_{Ai}$ represents the percentage of customers in the first segment having the categorical feature in the observed data and $\hat{p}_{Bi}$ represents the percentage of customers in the second segment having the categorical feature in the observed data. This test statistic is modified to account for the segments A and B overlapping, i.e., having a non-null intersection (that is, $n_{A \cap B} > 0$).

Since the segments overlap, the above-described variance is not valid. The variance must account for the covariance. A factor is included in that represents the covariance, which is a measure of how much dependence there is between the probabilities (i.e., one probability going up effecting the other probability going up, etc.). The covariance is:

$$\text{Cov}(\hat{p}_{Ai}, \hat{p}_{Bi}) = \frac{n_{A \cap B}}{n_A n_B} p_{A \cap Bi}(1 - p_{A \cap Bi}).$$

In the above formula, $p_{A \cap Bi}$ is the probability that a randomly selected individual j from $A \cap B$ will have $D_j = i$, that is, use the ith element of dimension D (that is, $p_{A \cap Bi} = P(D_j = i | \text{Segment } A \cap B)$). Then, with intersecting segments, the variance of $T_i$ takes the following form.

$$\sigma(\hat{p}_{Ai} - \hat{p}_{Bi})^2 = V(\hat{p}_{Ai} - \hat{p}_{Bi})$$
$$= \left[ \frac{p_{Ai}(1 - p_{Ai})}{n_A} + \frac{p_{Bi}(1 - p_{Bi})}{n_B} - 2 \frac{n_{A \cap B}}{n_A n_B} p_{A \cap Bi}(1 - p_{A \cap Bi}) \right].$$

The hypothesis of interest can be tested using the following z test statistic:

$$z_i = \frac{\hat{p}_{Ai} - \hat{p}_{Bi}}{\sigma(\hat{p}_{Ai} - \hat{p}_{Bi})}.$$

The p-value for the test statistic is given by:

$$p\text{-value} = 2 \times \Phi(-|z_i|),$$

where $\psi(\cdot)$ is the cumulative distribution function of the standard normal variable. This p-value represents the probability that the observed difference is due to random chance. The p-value essentially measures how likely it is to observe the difference that was observed if there actually is no difference between the probabilities in the entire population.

Once a formulation is determined and an appropriate factor is included to account for segment overlap, the technique 500 then computes the test statistic using the observed data, as shown in block 503, and determines the probability that the observed difference is due to random chance based on the test statistic as shown in block 504.

Common Knowledge

Figures 6, 7, 8:
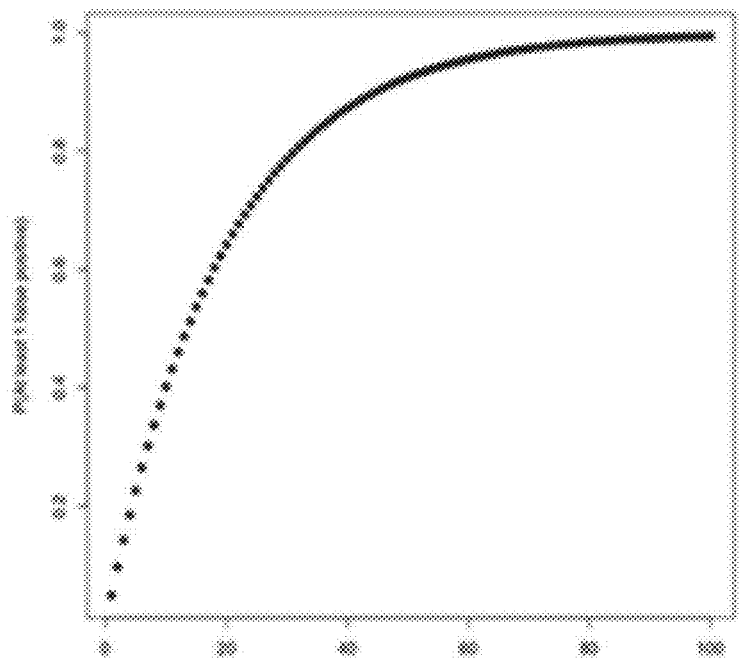
FIG. 6 is a chart illustrating relationships useful in identifying common knowledge differences.
FIG. 7 is a chart illustrating false discovery error.
FIG. 8 is a chart illustrating terms used in addressing false discovery error using a false discovery rate.

Certain techniques of the invention identify and eliminate obviously-related categorical features, which are referred to herein as categorical features that are based on "common knowledge." For example, a segment definition may relate to categorical features that will lead to categorical feature differences being found that are common knowledge and not of interest. For example, one may define a segment as (State="New York"). In such a case, it is common knowledge that cities outside of New York state are not in New York State and thus that customers from New York state will not be from those cities. However, this common knowledge fact may result in a segment difference if the other segment that is being compared has customers from those cities. As a specific example, if the second segment is customers having an iPhone® device, there may be a significant difference between the two segments with respect to the categorical feature of customers being from San Francisco. None of the first segment customers are from San Francisco and at least some percentage of the second segment customers are from San Francisco. However, this difference is based on common knowledge and is thus obvious. It is obvious that cities outside the New York state are more likely to be found in the other segment. Such common knowledge differences are automatically detected and are not presented in the interface as significant differences FIG. 6 is a chart illustrating relationships useful in identifying common knowledge differences. Common knowledge differences are identified as any segment difference in which any one of $N_{A0}$, $N_{A1}$, $N_{B0}$, or $N_{B1}$ is "0". These values are based on the observed data. $N_{A0}$ is the percentage of first segment customers (state="NY") having the individual categorical feature (city="San Francisco). $N_{A1}$ is the percentage first segment customers (state="NY") not having the individual categorical feature (city="San Francisco). $N_{B0}$ is the percentage of second segment customers (device="iPhone") having the individual categorical feature (city="San Francisco). $N_{B1}$ is the percentage second segment customers (device="iPhone") not having the individual categorical feature (city="San Francisco).

In the above example, given the segment and dimension elements chosen, $N_{A1}$ would be 0. The city is never going to be San Francisco in a segment of New York users. Since this is prior/common knowledge, there is no reason to include any difference based on this 0 value in the results. A difference may initially appear to be significant but, in fact, is only a difference because of a common knowledge fact. The approach identifies such common knowledge facts and avoids presenting differences based on common knowledge facts in an entirely data driven manner.

Multiple Test Error

Certain embodiments of the invention address error that results from conducting numerous tests, such as the numerous tests needed to compare segments with respect to hundreds or even thousands of categorical features. When testing a high number of hypothesis tests, one encounters the phenomenon known as "multiple testing." For example, if the level of each hypothesis test is $\alpha$, then the following holds.

$P(\text{Making an error} | H_0 \text{ is True}) = \alpha$ $P(\text{Not making an error} | H_0 \text{ is True}) = 1 - \alpha$ $P(\text{Not making an error in } m \text{ tests} | \text{all } H_0 \text{ are True}) = (1 - \alpha)^m$ $P(\text{Making at least 1 error in } m \text{ tests} | \text{all } H_0 \text{ are True}) = 1 - (1 - \alpha)^m$ As can be expected, as the number of tests (m) increases, the last term increases to 1 as illustrated in table 701 of FIG. 7. One such technique for controlling this error uses a false discovery rate to eliminate some of the tests to reduce the error that is expected.

The technique uses terms summarized in FIG. 8. In FIG. 8, "m" refers to the total number of hypotheses being tested and "m0" refers the number of tests where the null hypothesis is true. "R" refers to the number of tests where the test procedure declares the null hypothesis as false. "U" refers to the number of tests where the null hypothesis is true and the procedure agrees, also called "true negatives." "S" refers to the number of tests where the null is false and the procedure agrees, also called "true positives." "T" refers to the number of tests where the null is false, but the test procedure declares it as true, also called "false negatives." "V" refers to the number of tests where the null is true, but the test procedure declares it as false, also called "false positives."

The false discovery rate (FDR) is designed to control the proportion of false positives among the set of rejected hypotheses (R). The FDR is defined as V/R. The technique uses the Benjamini-Hochberg procedure (as defined below) to guarantee the FDR. The procedure is defined as follows. Let, the target False Discovery Rate be $\delta$.

1. Let the multiple hypotheses being conducted be denoted by $H^1, H^2, \ldots, H^m$, further, let the corresponding p-values be $p_1, p_2, \ldots, p_m$. Sort the p-values from smallest to largest such that $p_{(1)} \leq p_{(2)} \leq \ldots \leq p_{(m)}$, corresponding to the hypotheses $H^{(1)}, H^{(2)}, \ldots, H^{(m)}$.
2. Then find the highest l, for which the p-value, $p_{(l)}$ is less than or equal to $$\frac{l}{m} \times \delta.$$

3. Declare the hypothesis tests $H^{(1)}, H^{(2)}, \ldots, H^{(l)}$ rejected, the remaining hypotheses are failed to be rejected.

Differences for categorical features corresponding to the rejected hypothesis are not included in the differences displayed on the interface. In the above formulation, the null hypothesis is like $H_0$ below, and the alternate hypothesis is like $H_1$ below.

$$H_0: p_{Ai} = p_{Bi} \text{ vs. } H_1: p_{Ai} \neq p_{Bi}$$

Subscript i denotes the fact that that there are many different hypothesis (different dimension-element combinations) to be tested.

Performing Segment Comparison in an Efficient Manner

Techniques of the invention can compute segment differences in circumstances of customer data that involves thousands or even millions of categorical features. For example, for any given dimension (e.g. browser, city, country, web site from), there can be many tens, hundreds, thousands, or even more different dimension elements. Techniques of the invention can enhance the efficiency of identifying significant segment differences by selectively assessing only certain categorical features and/or using other techniques.

The following provides an example of more efficiently comparing categorical features of two segments being compared. The first step is to find the numbers of customers in each of the sets A, B, & A∩B. That is, $n_A$, $n_B$, & $n_{A \cap B}$. Next, the technique decides which categorical features to perform the hypothesis tests on. This is achieved by getting the k (e.g., at most 100) most common customer features in the set A∪B. Let the element vector returned by the ranked report (with filter A∪B) be $[e_1, \ldots, e_k]$ (e.g., $e_1$="chrome"). The element vector is a query that identifies the k-most common values amongst all of the possible values that the categorical factor can take.

From this query, the counts $v_i^{A \cup B}$, i.e., the number of individuals who have dimension element $e_i$ in the set of individuals A∪B, is also available. Note that for the hypotheses tests proposed, three terms for each of $[e_1, \ldots, e_k]$ are needed for the hypothesis tests described above. These are $v_i^A, v_i^B \& v_i^{A \cap B}$ (to compute the probabilities $p_{Ai}, p_{Bi} \& p_{A \cap Bi}$). These three terms can be efficiently determined using only two additional queries.

a. For all the elements in $[e_1, \ldots, e_k]$, use filter A to get the terms $v_i^A$.
b. For all the elements in $[e_1, \ldots, e_k]$, use filter A∩B to get the terms $v_i^{A \cap B}$.
c. For all the elements in $[e_1, \ldots, e_k]$, compute the terms $v_i^{A \cup B} - v_i^A + v_i^{A \cap B}$.

Thus, using these queries, the values needed for the hypothesis test are efficiently determined.

User Customization of Segment Comparison Results

Certain techniques of the invention provide one or more user interface features that allow the user to customize the appearance of the segment comparison results. For example, the user can optionally delete one or more of the categorical element differences that are identified as significant. For example, common knowledge differences may end up in results and the user can manually remove those items.

Combination of Features

Certain techniques combine some or all of the features discussed herein to provide an effective and efficient segment difference comparison. The following provides an example of such a combined technique. Let there be a total of d dimensions (D∈{1, ..., d}). Assume that the technique will perform at most k (say 100) hypotheses for each dimension. Let $k_D$ denote the number of hypothesis tests being conducted on dimension D, if |D| (number of unique values of D in A∪B)>k, then $k_D$=k, else $k_D$=|D|. That is, some dimensions may have fewer than k elements being tested. The following technique is applied.

1. Set FDR ($\delta$=0.01)
2. Get the sample sizes $n_A$, $n_B$, & $n_{A \cap B}$
3. For D in 1, ..., d
   a. Use the query described above, to get the list of elements $[e_1, \ldots, e_k]$ and the three vectors with $[v_1^A, \ldots, v_{k_D}^A]$, $[v_1^B, \ldots, v_{k_D}^B]$, and $[v_1^{A \cap B}, \ldots, v_{k_D}^{A \cap B}]$.
   b. For element in 1, ..., $k_D$
      i. Test the hypothesis using the risk difference test statistic, and store the tuple <Dimension,Element,$\hat{p}_A - \hat{p}_B$,p-value> ii. If $$p - \text{value} < \frac{\delta}{k \times d}$$

then visualize the tuple <Dimension,Element, $\hat{p}_A - \hat{p}_B$> in the UI. This ensures multiple testing correction.
      iii. The sorting of the UI table will be based on $|\hat{p}_A - \hat{p}_B|$.
4. Once all hypotheses tests have been completed, perform the Benjamini Hochberg Procedure to declare a set of l hypotheses as significant. Once again, sorting of the interface table will be based on $|\hat{p}_A - \hat{p}_B|$. The top items are presented based on available space.

Exemplary Computing Environment

Figure 9:
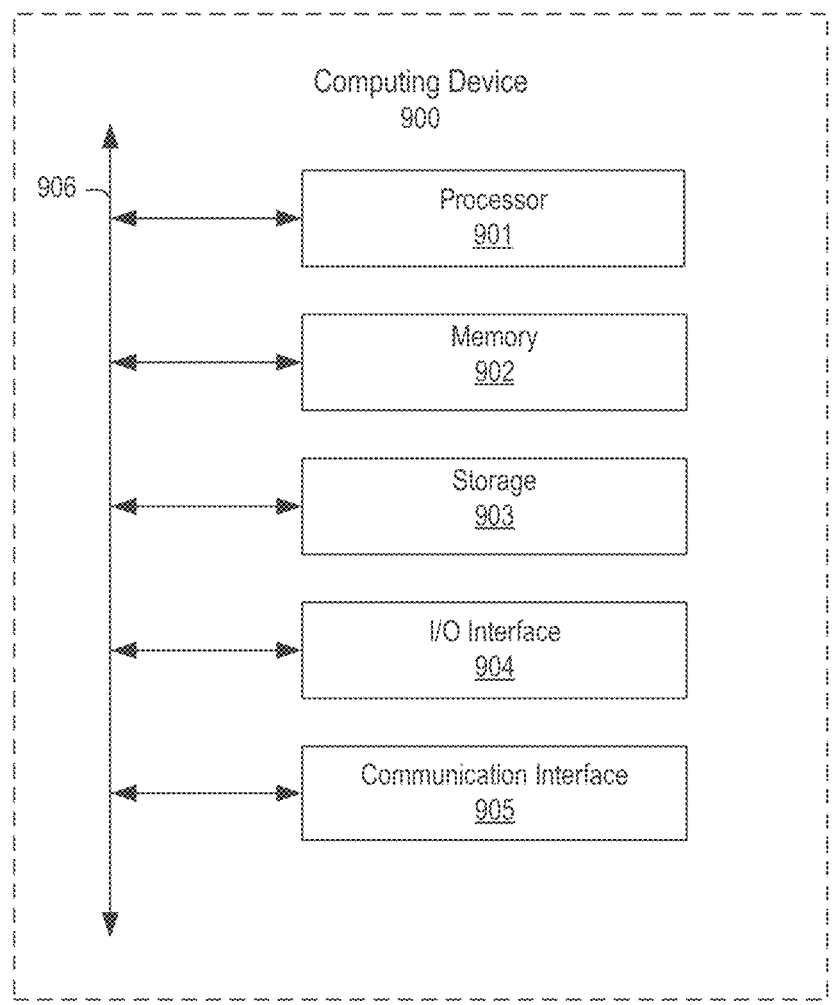
FIG. 9 is a block diagram depicting an example hardware implementation.

Any suitable computing system or group of computing systems can be used to implement the techniques and methods disclosed herein. For example, FIG. 9 is a block diagram depicting examples of implementations of such components. The computing device 90 can include a processor 901 that is communicatively coupled to a memory 902 and that executes computer-executable program code and/or accesses information stored in memory 902 or storage 903. The processor 901 may comprise a microprocessor, an application-specific integrated circuit ("ASIC"), a state machine, or other processing device. The processor 901 can include one processing device or more than one processing device. Such a processor can include or may be in communication with a computer-readable medium storing instructions that, when executed by the processor 901, cause the processor to perform the operations described herein.

The memory 902 and storage 903 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 900 may also comprise a number of external or internal devices such as input or output devices. For example, the computing device is shown with an input/output ("I/O") interface 904 that can receive input from input devices or provide output to output devices. A communication interface 905 may also be included in the computing device 900 and can include any device or group of devices suitable for establishing a wired or wireless data connection to one or more data networks. Non-limiting examples of the communication interface 905 include an Ethernet network adapter, a modem, and/or the like. The computing device 900 can transmit messages as electronic or optical signals via the communication interface 905. A bus 906 can also be included to communicatively couple one or more components of the computing device 900.

The computing device 900 can execute program code that configures the processor 901 to perform one or more of the operations described above. The program code can include one or more modules. The program code may be resident in the memory 902, storage 903, or any suitable computer-readable medium and may be executed by the processor 901 or any other suitable processor. In some Techniques, modules can be resident in the memory 902. In additional or alternative Techniques, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more Techniques of the present subject matter. Any suitable programming, scripting, or other type of language or combinations of languages may be used to implement the teachings contained herein in software to be used in programming or configuring a computing device.

Techniques of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific Techniques thereof, it will be appreciated that those skilled in the art, upon attaining an understanding of the foregoing, may readily produce alterations to, variations of, and equivalents to such Techniques. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for determining a difference between segments of customers, the method comprising:
    collecting customer data communicated using the Internet;
    identifying, from the customer data collected, first segment customers in a first segment based on a first rule and second segment customers in a second segment based on a second rule, the first and second rules identifying characteristics of customers used to determine whether customers are included in the respective first and second segments;
    calculating a first percentage of a first observed subset of the first segment customers having a categorical feature in observed data from at least hundreds of categorical features, wherein the observed data indicates whether customers in the first observed subset have the categorical feature or do not have the categorical feature;

calculating a second percentage of a second observed subset of the second segment customers having the categorical feature in the observed data from the at least hundreds of categorical features, wherein the observed data indicates whether customers in the second observed subset have the categorical feature or do not have the categorical feature;

determining a random chance probability based on hypothesis testing, said random chance probability indicative of whether an observed difference between the first percentage and the second percentage is due to random chance, wherein the hypothesis testing comprises:

comparing a first probability of observing the categorical feature in all customers in the first segment against a second probability of observing the categorical feature in all customers in the second segment based on the observed data, the comparing based on a factor that accounts for an overlap subset of customers in both the first segment and the second segment;

generating a test statistic based on said comparing; and determining the random chance probability based on the test statistic;

assessing the at least hundreds of categorical features based on the hypothesis testing; and providing, based on the assessment, different digital experiences to different customers when the different customers view a same webpage, a same application or a same digital content.

2. The method of claim 1, wherein comparing the first probability and the second probability comprises using the factor to account for a covariance measure of dependence between the first probability and the second probability.

3. The method of claim 1, wherein comparing the first probability and the second probability comprises:

determining a difference between the first probability of observing the categorical feature in all customers in the first segment and the second probability of observing the categorical feature in all customers in the second segment; and determining an adjusted difference by adjusting the difference to account for overlap of the segments based on a covariance measure of dependence between the first probability and the second probability.

4. The method of claim 3, further comprising:

providing, for display, the adjusted difference between the segments for the categorical feature.

5. The method of claim 1, further comprising:

evaluating differences between the first segment and second segment in observed data with respect to a set of categorical features;

selecting a subset of the set of categorical features based on random chance probabilities that observed differences between the first segment and second segment are due to random chance; and providing the selected subset of categorical features for display.

6. The method of claim 5, wherein providing the selected subset of categorical features for display comprises ordering the subset of categorical features based on the random chance probabilities.

7. The method of claim 5 further comprising:

determining that all customers in the first segment or second segment have a first categorical feature of the subset of categorical features; and excluding the first categorical feature from the subset of categorical features based on determining that all customers in the first segment or second segment have the first categorical feature.

8. The method of claim 5, further comprising:

determining that no customers in the first segment or second segment have a first categorical feature of the subset of categorical features; and excluding the first categorical feature from the subset of categorical features based on determining that no customers in the first segment or second segment have the first categorical feature.

9. The method of claim 5, further comprising:

determining an ordering of categorical feature differences based on the random chance probabilities;

determining a number of the categorical feature differences to reject based on a predetermined false discover rate and the random chance probabilities; and rejecting those of the categorical feature differences corresponding to the smallest random chance probabilities, wherein rejecting the categorical feature differences comprises rejecting the determined number of the categorical feature differences.

10. The method of claim 5, wherein selecting the subset of the set of categorical features comprises sequentially selecting the categorical features of the subset; and wherein providing the subset of categorical features comprises progressively providing the categorical features of the subset for display when the individual categorical features are selected for display.

11. The method of claim 1, further comprising:

receiving input on a user interface identifying an individual categorical feature for removal from the user interface; and removing the identified individual categorical feature from the user interface based on the input.

12. The method of claim 1, wherein determining the first percentage comprises determining the first percentage of first segment customers having a particular dimension element for a dimension, wherein dimension elements of the dimension have different values without any internal ordering of the different values; and wherein determining the second percentage comprises determining the second percentage of second segment customers having the dimension element for the dimension.

13. The method of claim 1, wherein determining the first percentage comprises determining the first percentage of first segment customers that are also in a third segment based on a third rule for including customers in the third segment; and wherein determining the second percentage comprises determining the second percentage of second segment customers that are also in the third segment.

14. A system for determining a difference between segments of customers for display in an interface, the system comprising:

a processor;

a means for collecting customer data communicated using the Internet;

a means for determining an observed difference between first segment customers and second segment customers having a categorical feature from at least hundreds of potential categorical features in observed data from the customer data collected;

a means for calculating a probability that the observed difference is due to random chance based on hypothesis testing;

a means for incrementally providing the categorical feature for display in the interface based on the probability that the observed difference is due to random chance, wherein the means for calculating the probability that the observed difference is due to random chance comprises instructions stored on a non-transitory computer readable medium that, when executed by the processor, compare a first probability of observing the categorical feature in all customers in the first segment against a second probability of observing the categorical feature in all customers in the second segment based on the observed data, the comparing based on a factor that accounts for an overlap subset of customers in both the first segment and the second segment;

generate a test statistic based on said comparing; and determine the random chance probability based on the test statistic; and a means for assessing the at least hundreds of categorical features based on the hypothesis testing; and a means for providing, based on the assessment, different digital experiences to different customers when the different customers view a same webpage, a same application or a same digital content.

15. The system of claim 14, wherein the means for providing the categorical feature for display further comprises means for providing additional categorical features for display on the interface based on random chance probabilities that observed differences between the first segment and second segment for the additional categorical features are due to random chance.

16. The system of claim 15, wherein the means for providing the additional categorical features for display on the interface further comprising means for incrementally providing the additional categorical features for display on the interface when each of the individual categorical features is selected for display.

17. A non-transitory computer readable medium comprising instructions for causing a computing device to perform operations comprising:

collecting customer data communicated using the Internet;

determining an observed difference between first segment customers and second segment customers having a categorical feature from at least hundreds of potential categorical features in observed data from the customer data collected;

calculating a probability that the observed difference is due to random chance based on hypothesis testing, wherein the hypothesis testing comprises computing a test statistic;

assessing at least hundreds of categorical features based on the hypothesis testing; and providing, based on the assessment, different digital experiences to different customers when the different customers view a same webpage, a same application or a same digital content.

18. The non-transitory computer readable medium of claim 17, wherein computing the test statistic comprises using a factor to account for a covariance measure of dependence between the first probability and the second probability.

19. The non-transitory computer readable medium of claim 17, wherein the hypothesis testing comprises:

comparing a first probability of observing the categorical feature in all customers in the first segment against a second probability of observing the categorical feature in all customers in the second segment based on the observed data, the comparing based on a factor that accounts for an overlap subset of customers in both the first segment and the second segment;

generating a test statistic based on said comparing; and determining the random chance probability based on the test statistic.

* * * * *